United States Patent
Yang

(10) Patent No.: US 7,080,199 B2
(45) Date of Patent: Jul. 18, 2006

(54) METHOD TO MAINTAIN DATA INTEGRITY DURING FLASH FILE TRANSFER TO RAID CONTROLLER FLASH USING A TERMINAL EMULATION PROGRAM

(75) Inventor: Jinchao Yang, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 441 days.

(21) Appl. No.: 10/620,105

(22) Filed: Jul. 15, 2003

(65) Prior Publication Data

US 2005/0015412 A1    Jan. 20, 2005

(51) Int. Cl.
G06F 12/06         (2006.01)
(52) U.S. Cl. .................. 711/114; 711/133; 711/171; 711/173
(58) Field of Classification Search ................ 711/133, 711/114, 171, 173; 707/201; 713/176
See application file for complete search history.

(56) References Cited

U.S. PATENT DOCUMENTS

| | | | | |
|---|---|---|---|---|
| 5,504,875 A | * | 4/1996 | Mills et al. ................. | 711/171 |
| 5,802,549 A | * | 9/1998 | Goyal et al. ................. | 711/102 |
| 5,867,736 A | * | 2/1999 | Jantz ............................ | 710/74 |
| 6,260,156 B1 | * | 7/2001 | Garvin et al. .................. | 714/8 |
| 6,282,584 B1 | * | 8/2001 | Garroussi et al. .............. | 710/5 |
| 2004/0006701 A1 | * | 1/2004 | Kresina et al. ............. | 713/189 |
| 2005/0015412 A1 | * | 1/2005 | Yang .......................... | 707/201 |

OTHER PUBLICATIONS

"NEC Express5800 Series HostRAID Adaptec Storage Manager Browser Edition User's Guide", © Feb. 2003 Adaptec , pp. 1-38.*

* cited by examiner

Primary Examiner—Brian R. Peugh
(74) Attorney, Agent, or Firm—Suiter West Swantz PC LLC

(57) ABSTRACT

A method and system which uses the method maintains data integrity during file transfers from a local drive medium to a RAID controller flash memory. A signature is added to the data file in the local drive by a utility program. The signature is multibyte and, preferably, is either four or eight bytes long. The RAID controller is loaded with software that traverses the data file until the signature is found. The RAID controller software discards the signature and any after patched data and stores the stripped off data into its flash memory. The utility program overcomes potential incompatibility between the file transfer protocol and a terminal emulation program.

17 Claims, 8 Drawing Sheets

METHOD TO MAINTAIN DATA INTEGRITY DURING FLASH FILE TRANSFER TO RAID CONTROLLER FLASH USING A TERMINAL EMULATION PROGRAM

FIELD OF THE INVENTION

The present invention generally relates to the field of computer file transfer methods, and particularly to serial port file transfer methods.

BACKGROUND OF THE INVENTION

File transfer is commonly performed by computer applications that access disk drives. The general file transfer methods from a local drive to a redundant array of disks (RAID) controller include, but are not limited to, Ethernet protocol, Fibre channel protocol, small computer system interface (SCSI) protocol, and serial port (X/Z) modem protocol. Although considerably slower than other aforementioned methods, serial port file transfer via modems often is indispensable during software development, especially when other methods are not functional or available. In the current development of RAID controller firmware, various terminal emulation programs may be used for file transfer. Useable terminal emulation programs include ProComm Plus, HyperTerminal, Tera Term, and the like. These terminal emulation programs are extensively used during product test and verification because of their user friendly interface and powerful test script handling ability.

When a flash file is transferred from a host's local storage medium (e.g., disk drive) to the RAID controller by the Xmodem file transfer protocol, three steps are generally performed (as shown in FIG. 5): 1) the transfer of the flash file from the host's local medium to the RAID controller's buffer memory (505 to 510); 2) the adjustment of the flash file size in buffer (i.e., the resetting the pointer to the end of file) and removal of file transfer protocol patched data bytes 515; and 3) the writing of the flash file (with adjusted size) from the RAID controller's buffer to its flash chip 520. The flash size increases by 0 to 127 bytes for 128-modem or by 0 to 1023 bytes for a 1K-modem during the file transfer process because of the data-patch transfer protocol. For a 128-byte modem, because 128*M is always greater than N by 0 (only when N is a multiple of 128) to 127 bytes, an Xmodem file transfer protocol patches these bytes with a certain data pattern—usually 0×1A. Different terminal emulation programs may not interpret in the same way the file transfer protocol byte pattern patched at the end of the transfer file data.

The relationship between flash file size of N bytes and the number M of data word transfers may be obtained as follows:

If ($N/128=0$)

$M=(int)N/128$;

Else $M=(int)N/128+1$;

In most cases, N is not divisible by 128, so M would normally be (N/128+1). The additional data may cause the data integrity to be lost in terms of the flash file size. In fact, there is no effective way to know the original flash file size during the Xmodem file transfer since the end of file (EOF) indicator (if any) of the flash file may not be transferred with the file itself. The size of the flash file transferred to buffer memory may be determined later from the number of transfers (which is M) after the flash file transfer to the RAID controller terminates.

The file transfer protocol normally patches a pattern (e.g., 0×1A) at the end of the data file if the original file size is not a multiple of 128 bytes. However, the terminal emulation program (e.g., ProComm Plus) may recognize a different pattern such as 0×00. Other incompatibilities may be encountered such that the terminal emulation program (e.g., ProComm Plus) may not be the only software entity that violates the file transfer protocol (e.g., Xmodem).

Assuming the file transfer protocol patched pattern is PQ, the patched pattern may vary according to the terminal emulation program used (e.g., PQ may be 0×1A or 0×00 or the like based on the memory dump of the transferred files, depending upon whether the Xmodem protocol is followed). It is necessary to check the end of the buffered flash file for the data pattern. If the last byte data is LS, the end of the flash file is searched backward until the first byte of non-LS data is encountered. If there are multiple occurrences of LS, then there is a strong probability that LS is the data patched by the file transfer protocol. When the original flash file size is exactly a multiple of 128 bytes, this algorithm will probably fail since there is no X modem patched data.

As shown in FIG. 5, a current solution is to compare the last bytes of data of the transferred flash file (in RAID controller's buffer memory) against a standard patch pattern (e.g., 0×1A). If they match consecutively, then the data will be removed from the end of the transferred flash file and the flash file length will be decreased by the corresponding number of bytes that are removed. During this "data peeling" process (step 2), the flash file size is adjusted internally in the controller's buffer and the "new" flash file is then written to the flash chip (step 3).

Two problems arise when flash file transfers are performed using the file transfer protocol for personal computers through the above three step approach:

1) If the last byte or a few bytes of the original flash file matches the data pattern patched by the file transfer protocol (e.g., 0×1A as may be used by Xmodem), then these data bytes will be unnecessarily removed, as demonstrated in FIG. 6);
2) If the terminal emulation program violates the file transfer protocol data patch (e.g., ProComm Plus patches 0×00), then the patched data will not be removed by checking against standard file transfer protocol patch pattern (e.g., FIG. 7).

The first case causes loss of information. The second case causes erroneous data (i.e., the patched data) to become part of the transferred flash file. In both cases, the integrity of information is lost, and the system may not boot up properly when the control processor tries to fetch data from the controller flash after a power cycle or reboot operation.

Therefore, it would be desirable to provide a method and system to maintain data integrity during flash file transfer to a RAID controller flash memory using a terminal emulation program.

SUMMARY OF THE INVENTION

Accordingly, the present invention is directed to a method and system for transferring a data file from a local drive to a RAID controller in which a recognizable signature is added to the data file before transfer. The RAID controller strips off the data and stores it in its flash memory.

In a first aspect of the present invention, a method for transferring data files from a local drive medium to a RAID controller flash memory includes the steps of obtaining a data file from the local drive, adding a signature to the data file to form a transferable file, and, if needed, patching the transferable file in the last transfer to ensure a same number of bytes in each transfer of portions of the transferable file from the local drive medium to the RAID controller flash memory.

In a second aspect of the present invention, a multiple disk array system includes a RAID controller having a flash memory and a host system with two or more disk drives are coupled. A selected disk drive transfers a data file to the RAID controller by attaching a multibyte signature to the end of the data file before transfer.

The solution of the present invention is to make the last byte data of the flash file always different from the data patched by the file transfer protocol so it will always be recognized and won't be removed accidentally by the "data peeling" process. In the present invention, a utility program is created or loaded that pads/attaches certain bytes of data as a signature at the end of the flash file to be transferred. Data patterns such as 0×FF (or 0×00) are patched as an easily detectable signature at the end of the flash file to be transferred. A terminal emulation program then patches any necessary data bytes (i.e., 0×1A) after the signature. The easily detectable signature when recognized by the RAID controller determines the end of the data buffer to be written into flash memory. The size and pattern of the patched signature is known beforehand. The utility program obviates misreadings of the end of data in a file by other software entities.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
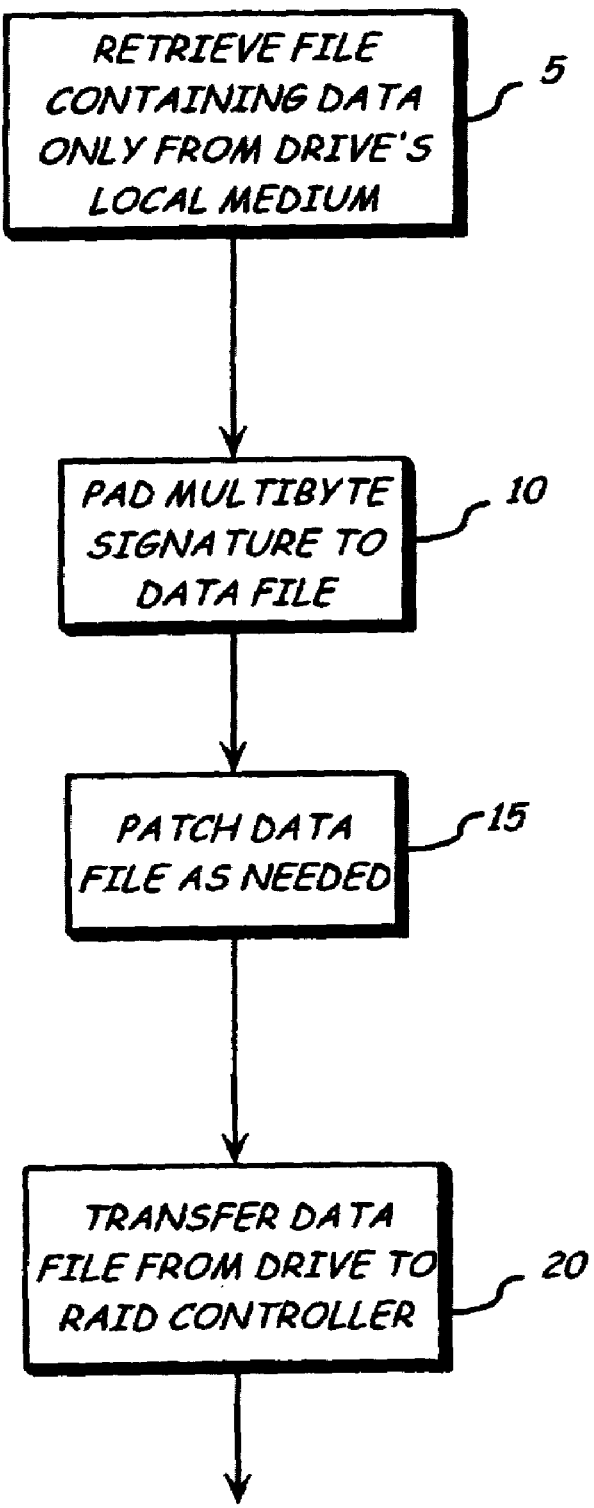
FIG. 1 shows a flow chart of the general method of the present invention.
Figure 1:
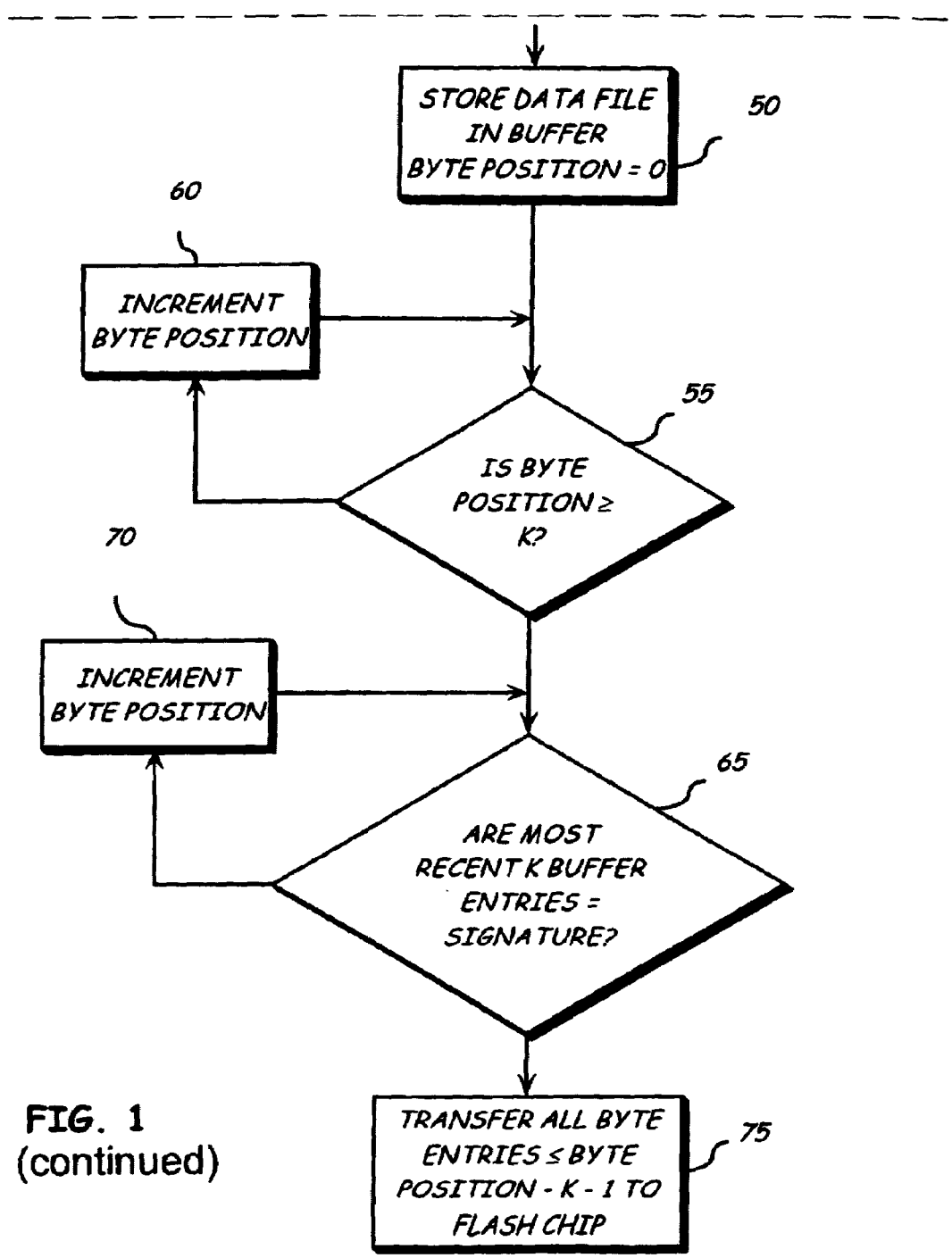

Reference will now be made in detail to the presently preferred embodiments of the invention, examples of which are illustrated in the accompanying drawings.

The present invention relates to a method and system which uses the method in which the correct flash file size is retrievable with consistency. A signature of K bytes is affixed to the flash file data. This signature is dynamically generated and attached to the end of the flash file by the utility program when the flash file is provided as an input. The utility program of the present invention enhances interoperability between software entities involved in file transfers; especially, between the file transfer protocol (such as Xmodem) and a terminal emulation program. Terminal emulation programs that may be used with the present invention include ProComm Plus, HyperTerminal, Tera Term, and the like.

Flash file is defined here as the file that needs to be loaded to the flash chip of the RAID controller before the RAID controller can boot up. The flash chip is preferably a placeholder for the executable RAID controller firmware that contains data and instructions. To become functional upon power up, the controller processor needs to fetch data and instructions from the flash chip to the processor memory via the processor memory—flash bridge. If the flash file resident on the flash chip is corrupted, the RAID controller normally can not boot up after a reboot or power cycle operation or its behavior can not be guaranteed after boot up.

The general method for maintaining data integrity with the file transfer protocol file transfer of the present invention takes into consideration the failure of the prior art and may be derived with the following assumptions:

1) The flash file size N may or may not be a multiple of 128 bytes;
2) The patched data by the host file transfer protocol is PQ, the patch data pattern is fixed for a specific terminal emulation program throughout the flash file transfer (e.g., it is always 0×00 for ProComm Plus);
3) The patterns of the signature to be padded by the utility program may be variable. For example, the pattern 0×FF00FF00, using two data patterns (0×FF and 0×00) may be padded at the end of the flash file;
4) The number of bytes of the padded signature is fixed to K bytes (K is an even number);
5) The padded signature is part of the flash file to be transferred, and is stored on the local medium of the host;
6) The number of bytes of the patched data (e.g., V) is variable during the file transfer protocol transfer and depends on the size of the original flash file (i.e., V=M*128−N−K, where M is the number of packets transferred via the terminal emulation program, N is the original flash file size before transfer, and K is the size of the padded signature by the utility program); and
7) The individual bytes of the RAID controller buffered flash file may be accessed by fileBuffer[i], where the maximum value of i is (fileLength−1), where fileLength is the size of the flash file in buffer, i.e., the first byte of data is fileBuffer[0], and the last byte is fileBuffer[fileLength−1]. The flash file size that is transferred to the RAID controller is M*128 bytes.

FIG. 1 shows a flow chart of the general method of the present invention. The processor of the local storage medium retrieves a file containing only data from the local medium 5. A multibyte signature is padded to the data file 10. The flash file with a signature attached may be stored in non-volatile memory (such as a disk drive) or volatile memory (such as cache or main memory of a host computer). In the present example, data words are 128 bytes long. The location of the end of valid data in the transfer file may vary. For instance, byte 127 or byte 0 or another byte may mark the end of valid data. The signature is preferably multibyte and, more preferably, is either four or eight bytes to enhance the uniqueness of the signature. If the last byte of the signature does not coincide with the last byte of the data word, then a byte pattern is preferably patched so as to fill the remainder of the last data word 15. If the last byte of the signature coincides with the last byte of the last data word, then the utility program may be implemented so as to either add an entire data word of patched byte patterns or to not pad at all. The constructed data file is then ready to send from the local storage medium (e.g., disk drive) to the RAID controller 20.

The RAID controller receives the data file and stores it in a buffer 50. The RAID controller checks to see if the first K bytes have been examined 55. If not, the byte position is incremented and the next byte is examined 60. Otherwise, the RAID controller software or firmware checks the last K buffer entries to determine if there is a signature match 65. If there is no match, the byte position is incremented and the next set of K bytes is examined 70. If there is a match, the all buffer entries up to but not including the signature are transferred to the flash chip 75. Alternatively, the RAID controller processor may start the data file identification process by working backward from the end of the buffer.

Figure 2:
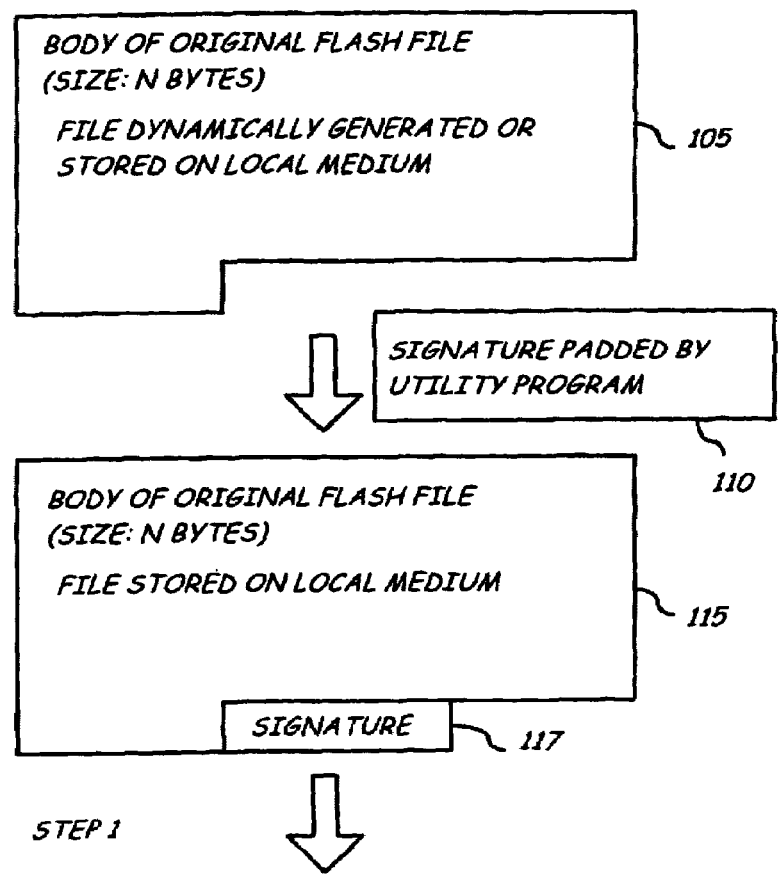
FIG. 2 shows a pictorial representation of an exemplary method of the present invention.
Figure 2:
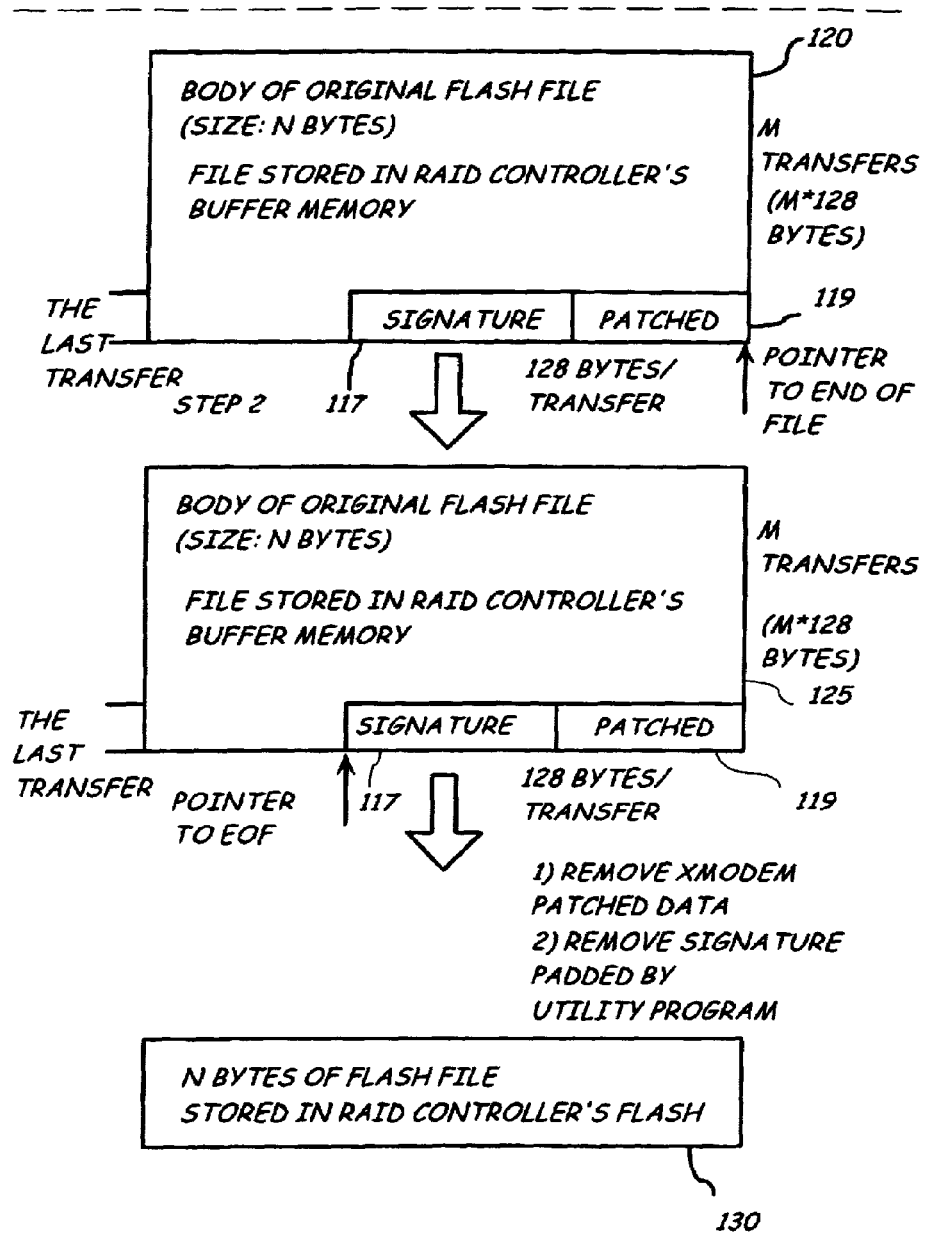
Figure 3:
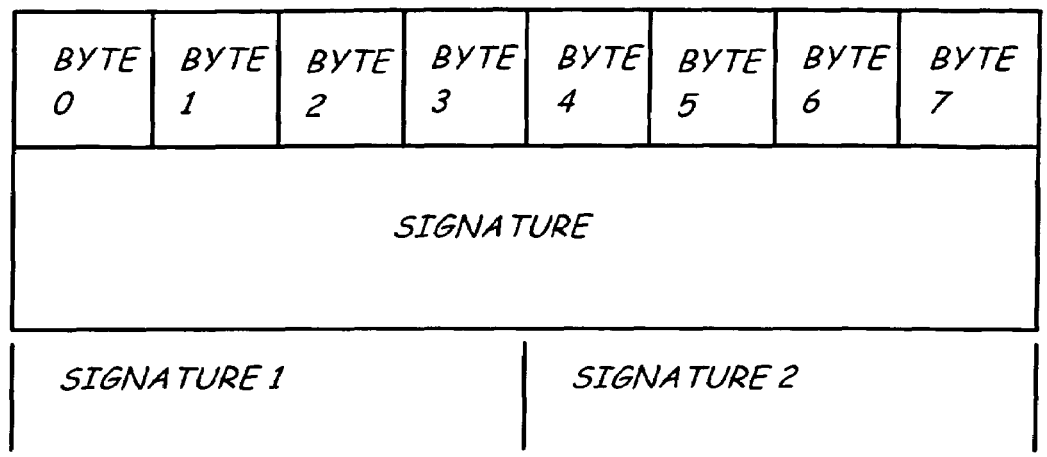
FIG. 3 shows an exemplary format for a signature used in the method of the present invention.

A pictorial representation of the preferred method of the present invention is shown in FIG. 2. The flash file to be transferred is initially stored on a local medium (e.g., disk drive). The original size is N bytes 105. The padded signature separates the file transfer protocol patched byte pattern from the transfer file data. A utility program 110 adds a signature to the original file 105. The signature preferably is of multiple bytes and, more preferably, is four or more bytes. Multiple bytes help ensure the uniqueness of the signature (e.g., an unusual sequence of characters such as 0×DEAD-FACE or a sequence of rarely used or unusual characters—the term "character" is to be construed to refer to any bit combination of the data format, including the bit pattern for NUL). When more than four bytes are used, the signature is preferably implemented as multiple signatures such that each signature contains either four bytes or two bytes of data. For example, if eight bytes are used as the signature, then two four-byte signatures (Signature1 and Signature2) may be used to replace the original eight-byte signature. This arrangement of multiple signatures is convenient for data manipulation by software or firmware code. The relations of the 8-byte signature and the two four-byte signatures is shown in FIG. 3. The whole signature must be matched to mark the end of the original flash file. After the signature is added, the last file transfer data word is patched 119 with a pattern determined by the terminal emulation program or otherwise determined to fill up the unassigned remainder of the data word. If the signature is not encountered after the file transfer, a warning may be issued to the user such as by the display of an error message on a graphical user interface or by an audible and/or visual alarm.

When file transfer is started, the file transfer protocol transfers the data from the local medium to the RAID controller's buffer memory 120, which is further written into its flash chip (or other non-volatile memory) 130. The data transferred to the buffer memory will not stop until M*128=N+V+K bytes of data have been transferred. The RAID controller will first assume the size of the flash file to be M*128 (which is N+V+K). The RAID controller checks the last K bytes of data to see whether they match the padded signature (for the case that N+K=M*128). If no match is found, the RAID controller gets the last byte of data at fileBuffer[M*128−1]. If the last byte is LS, then the RAID controller firmware checks to see whether data at fileBuffer[M*128−1−index] is the same as LS. If there is a match, the index value is incremented by one and the flash file length is decremented by one; otherwise, it is assumed the end of the file transfer patched data has been reached. The last part of the data will be the K bytes padded by the utility program.

The pseudo code for step 2 to correctly retrieve the original flash file size by detecting patched (by the file transfer protocol) and padded signature (by the utility program) is given as follows:

```
// phase one: define/get overall file information: length, last byte of
data and signature
    int    fileLength = M * 128 (= N + V + K);
    char   fileBuffer [M * 128];
    char   lastChar = fileBuffer [M * 128 − 1];
    char   Signature[K] = predefined signature bytes;
// phase two: check and remove Xmodem patched data
    int    index = 0;
    // Make sure the end of file is not the signature
    if (
        (fileBuffer[M * 128 − 1 − index] != Signature[K − 1]
        && (fileBuffer[M * 128 − 1 − (index + 1)] !=
        Signature[K − 2]
        && ...
        && (fileBuffer[M * 128 − 1 − (index + 1)] != Signature[0])
    )
    {
        while (fileBuffer[M * 128 − 1 − index] == lastChar)
        {
            index++; fileLength−−;
        }
    }
// phase three: find the real end of the original flash file
    if   (
            (
                fileBuffer[fileLength − 1]
            |   (fileBuffer[fileLength − 2] << 8)
            | ...
            |   (fileBuffer[fileLength − 1 − K] << (K − 1) * 8)
            ) == Signature
        )
        // the end of the file is met Signature is removed
        file Length −= K;
// phase four: write file to flash chip
        write the recovered file (identical to the one stored in local medium)
to flash memory.
```

The signature (K bytes) may or may not be peeled off from the flash file in step 3 before the flash file is written to the flash depending on whether the signature has been used in checksum (or parity) calculation. Here it is assumed that it is not used in checksum generation and is always removed.

The above method maintains the data (flash file) integrity during X modem file transfer by correctly retrieving the original flash file size. This method applies to all the terminal emulation programs that support serial port data transfer regardless of whether the Xmodem transfer protocol is followed or not. In essence, this method provides a virtual end of file (EOF) indicator to the flash file.

Figure 4:
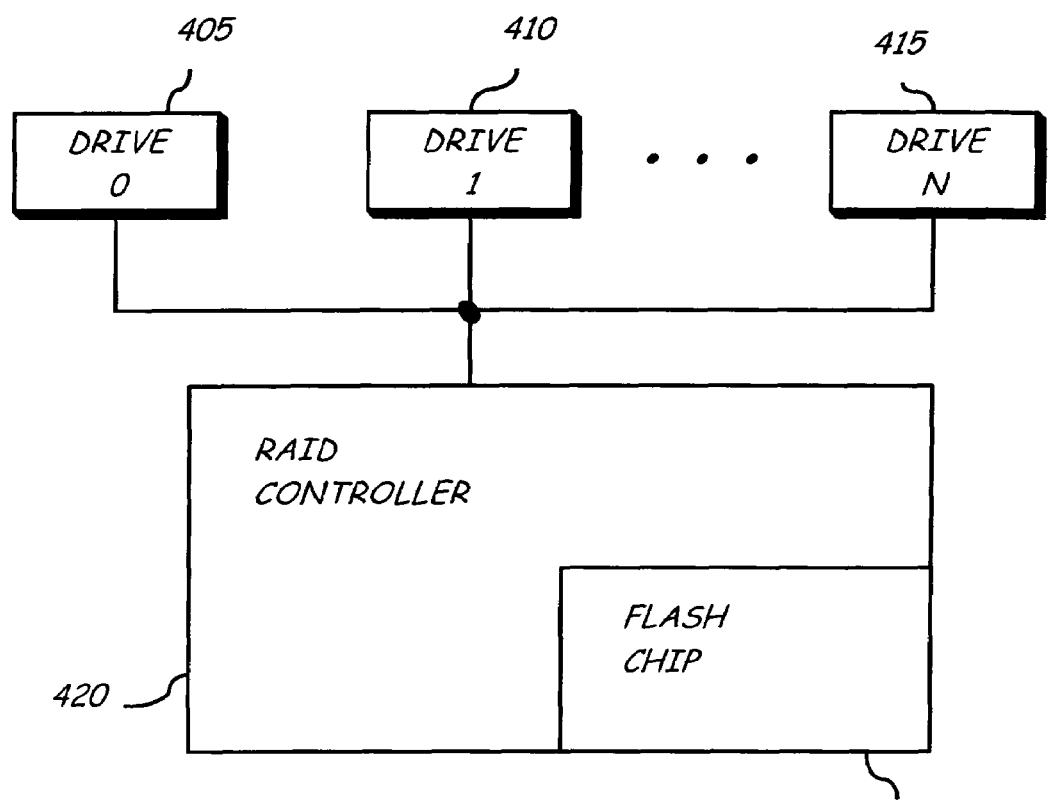
FIG. 4 shows an exemplary system that uses the method of the present invention.
Figure 5:
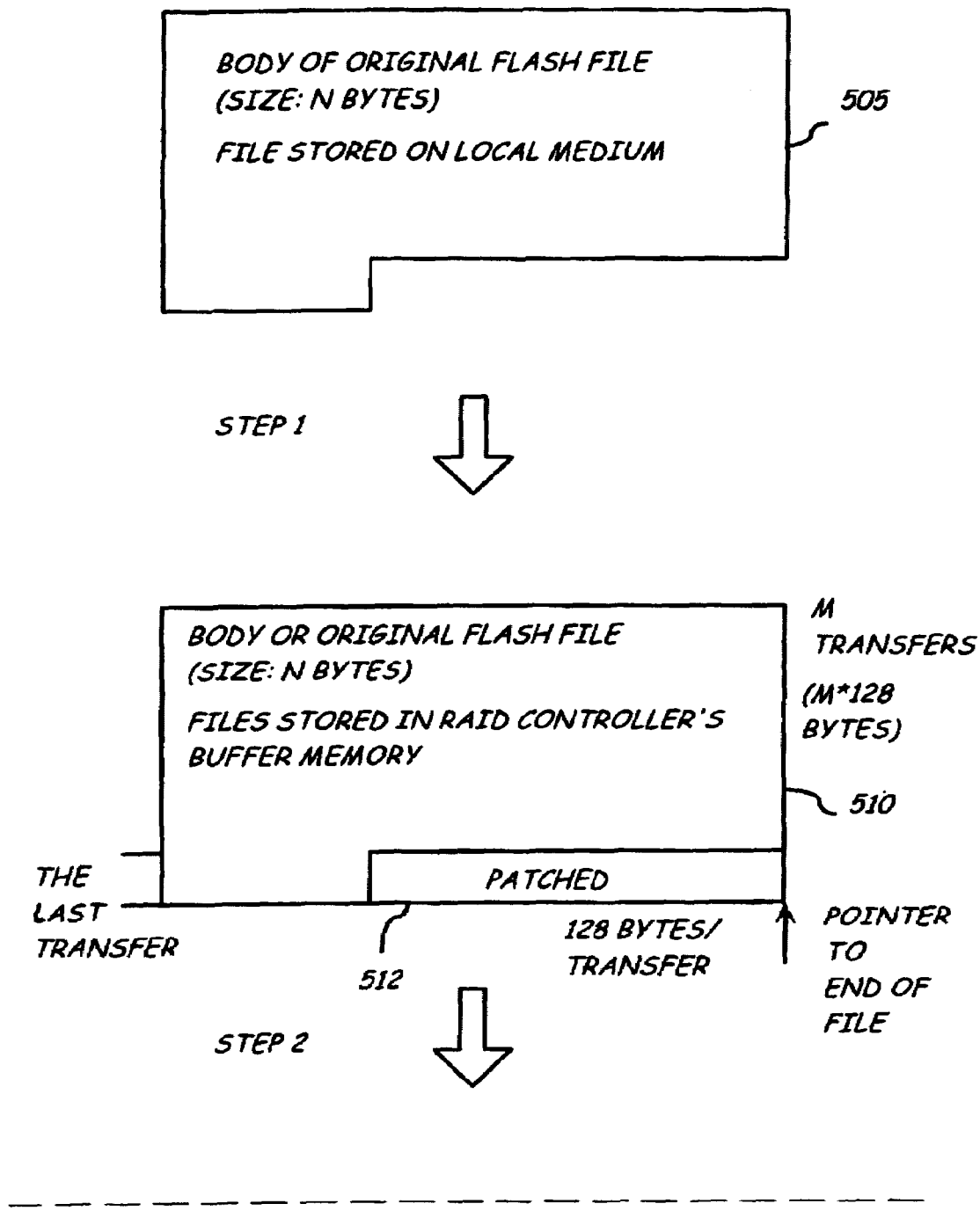
FIG. 5 shows a current method for transferring files from a local medium to a RAID controller.
Figure 5:
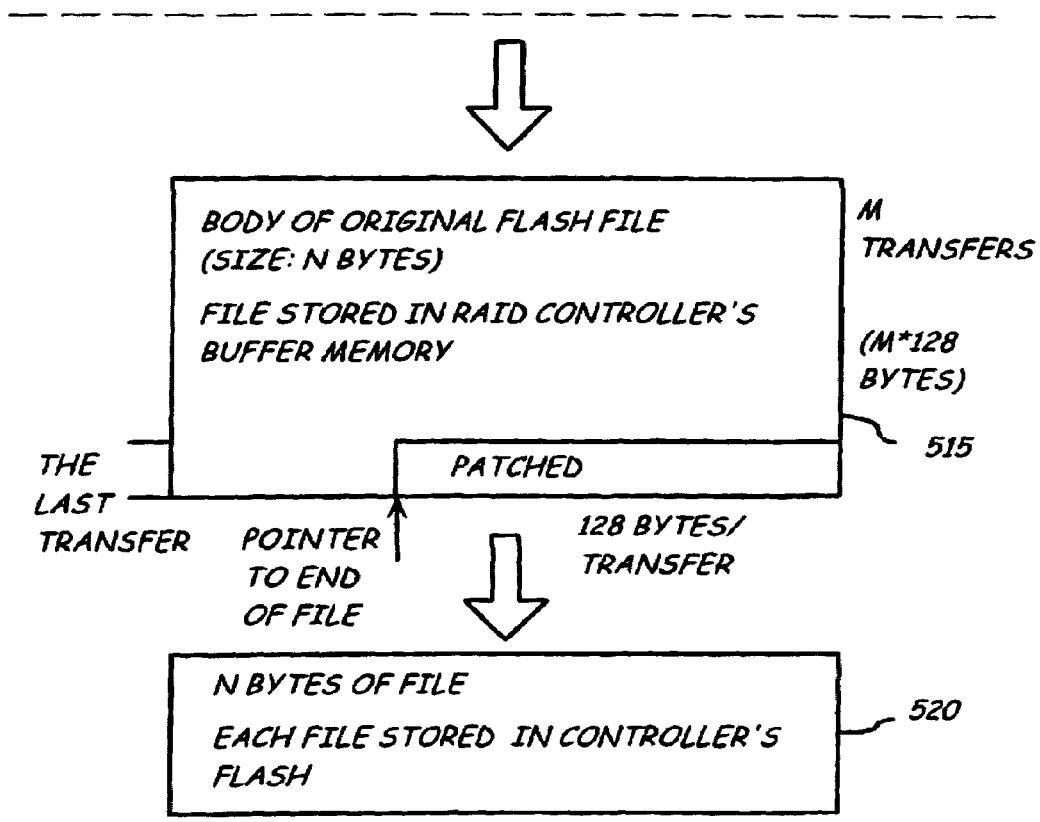
Figure 6:
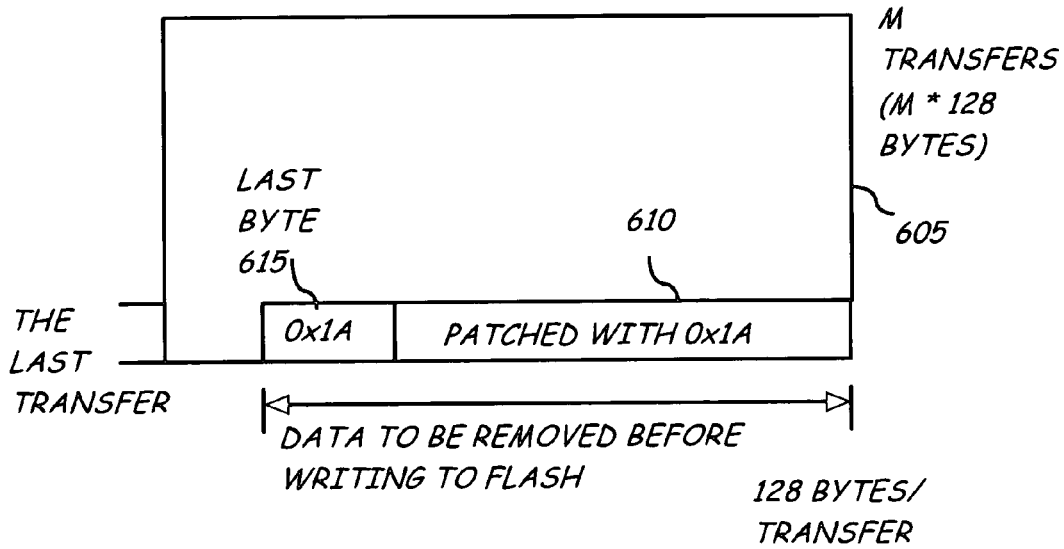
FIG. 6 illustrates a first problem with the current method for transferring files.
Figure 7:
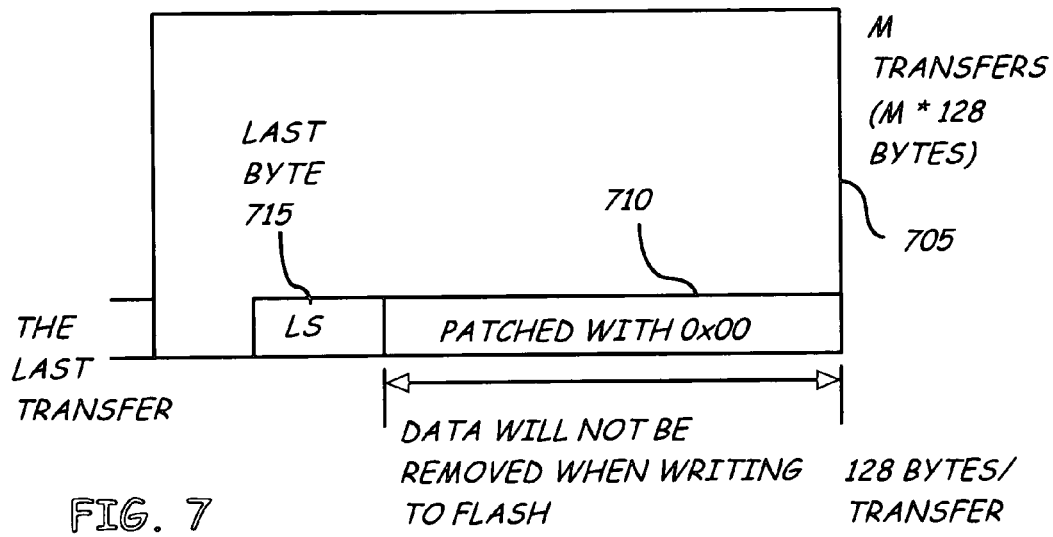
FIG. 7 illustrates a second problem with the current method for transferring files.

FIG. 4 illustrates an exemplary system of the present invention. A RAID controller 420 is coupled to N+1 drives 405–415 by a bus. The RAID controller 420 initiates communications with the selected drive for data transfers. The local drive may be capable of sending status information to the RAID controller. When the selected drive sends a data file to the RAID controller, the RAID controller peels away the data using the method described above and writes the data to the flash chip 425.

The present invention may be practiced or implemented in a variety of ways. The present invention may be practiced with American Standard Code for Information Interchange (ASCII) format, extended ASCII format (such as OEM or ANSI), Extended Binary Coded Decimal Interchange Code (EBCDIC) format, or other suitable data format. Preferably, the signature bytes of utility program are set by the manufacturer, but may be made modifiable by a user on the fly (as through a graphical user interface). The signature may be made up of a combination of unusual characters. It may be advisable to avoid those characters that are more likely to be implemented as executable functions, handshaking signals, or the like. The signature may be used to test the communications link between the local storage medium and the RAID controller by optimizing the variation of the bit patterns of the signature bytes. The number of bytes in the signature code may be implemented or modified so as to be two, four, or a different even number. The size of the data word may be implemented as or may be made modifiable to 256, 512, 1024, 2048, or another number of bytes.

It is believed that of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages, the form hereinbefore described being merely an explanatory embodiment thereof. It is the intention of the following claims to encompass and include such changes.

What is claimed is:

1. A method for transferring data files from a local drive medium to a redundant array of independent disks (RAID) controller flash memory, comprising:
   obtaining a data file from a local drive;
   adding a signature to the data file to form a transferable file; and
   padding the transferable file to ensure a same number of bytes in each transfer of portions of the transferable file from the local drive to a flash memory of a RAID controller.

2. The method of claim 1, wherein the signature is formed from two or more bytes.

3. The method of claim 2, wherein the signature is formed from four bytes.

4. The method of claim 2, wherein the signature is formed from eight bytes.

5. The method of claim 1, wherein each of the portions of the transferable file contains 128 bytes.

6. The method of claim 1, wherein each of the portions of the transferable file contains 1024 bytes.

7. The method of claim 1, wherein data in the data file is either in American Standard Code for Information Interchange (ASCII) format or in Extended Binary Coded Decimal Interchange Code (EBCDIC) format.

8. The method of claim 1, wherein the method ensures data integrity when a terminal emulation program is used to access the data file.

9. The method of claim 8, further comprising storing the transferable file in a buffer in the RAID controller.

10. The method of claim 9, further comprising identifying the padded signature of the transferable file, identifying the end of the data file, and writing the data file to the flash memory.

11. A system, comprising:
    a redundant array of independent disks (RAID) controller having a flash memory; and
    a host having two or more disk drives, the host being coupled to the RAID controller, wherein a selected one of the two or more disk drives is capable of transferring a data file to the RAID controller by attaching a multibyte signature to the end of the data file before transfer, the signature being attached through the operation of a utility program, the RAID controller containing software that recognizes the multibyte signature attached to the end of the data file before transfer wherein the data file contains multiple data words, each of the multiple data words having multiple bytes, and wherein the signature forms a portion of one or two data words, the data file being further padded with a terminal emulation program specific pattern after the signature in the data file if a last byte of the signature does not coincide with a last byte of a last data word.

12. The system of claim 11, wherein the specific pattern is either 0×00 or 0×1A.

13. The system of claim 12, wherein the signature includes alternating bytes of 0×FF and 0×00.

14. The system of claim 12, wherein the signature includes a byte having a value other than 0×FF and 0×00.

15. The system of claim 12, wherein the signature is formed of alphanumeric characters.

16. The system of claim 11, wherein data integrity is maintained when a terminal emulation program is used.

17. The system of claim 16, wherein the terminal emulation program recognizes a different end of file patched data pattern than does a file transfer program used by the system.

* * * * *